Nov. 1, 1966
R. W. DUNHAM
3,283,216
ELECTRICAL CIRCUIT BREAKER AND PANELBOARD WIRING ARRANGEMENT
Filed March 8, 1963
3 Sheets-Sheet 1
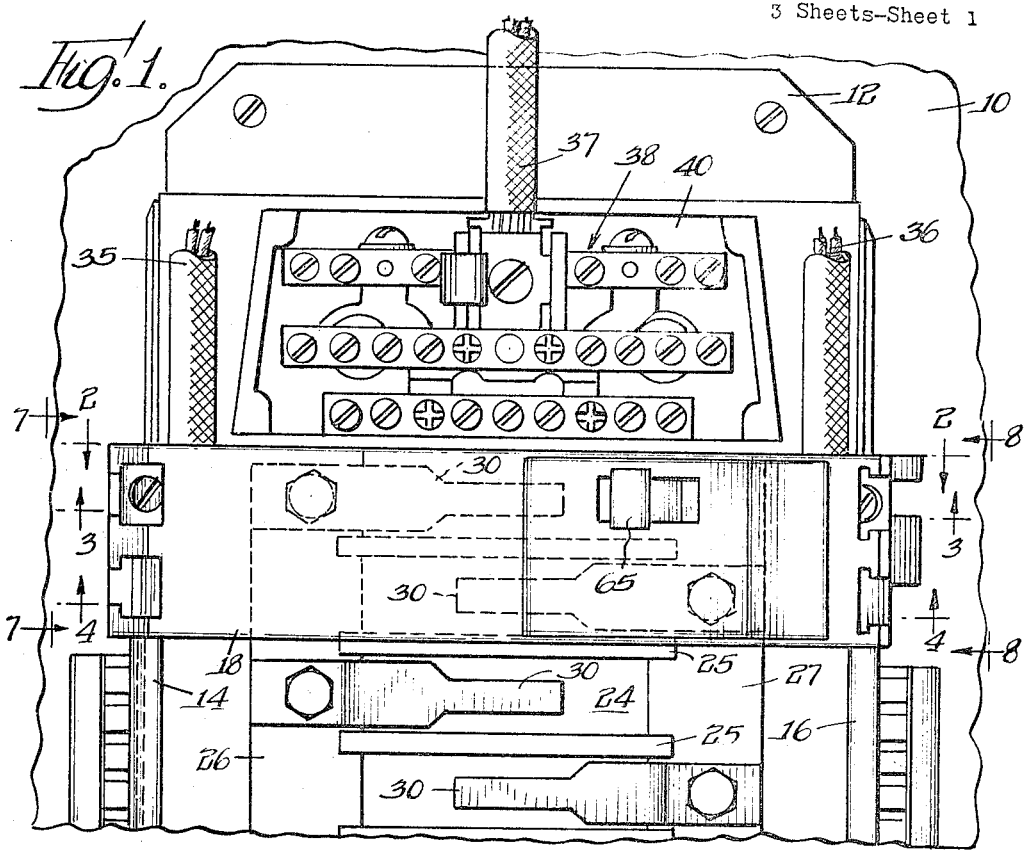
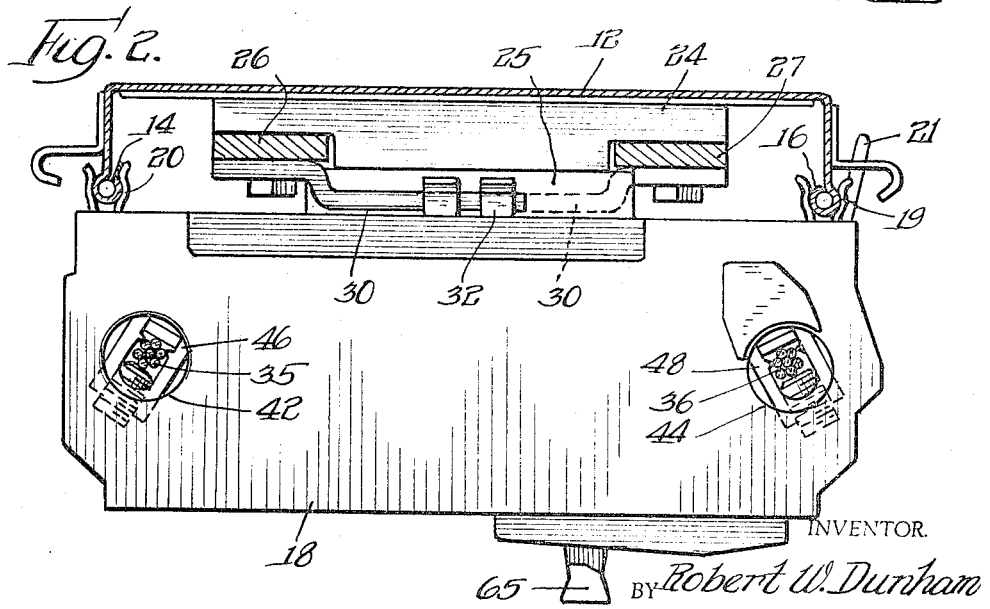
INVENTOR.
BY Robert W. Dunham
Paul J. Rose
Atty.

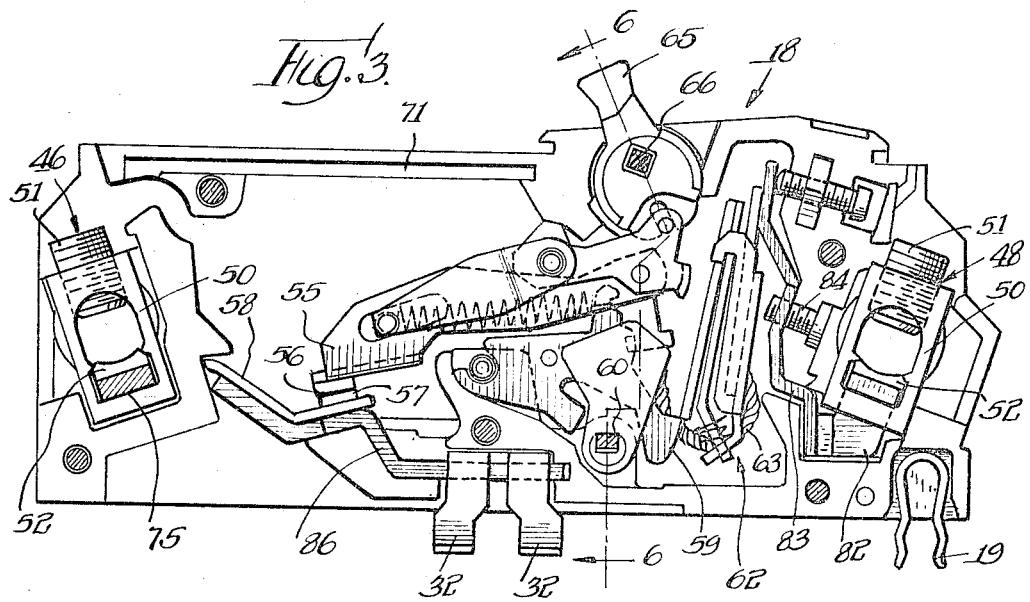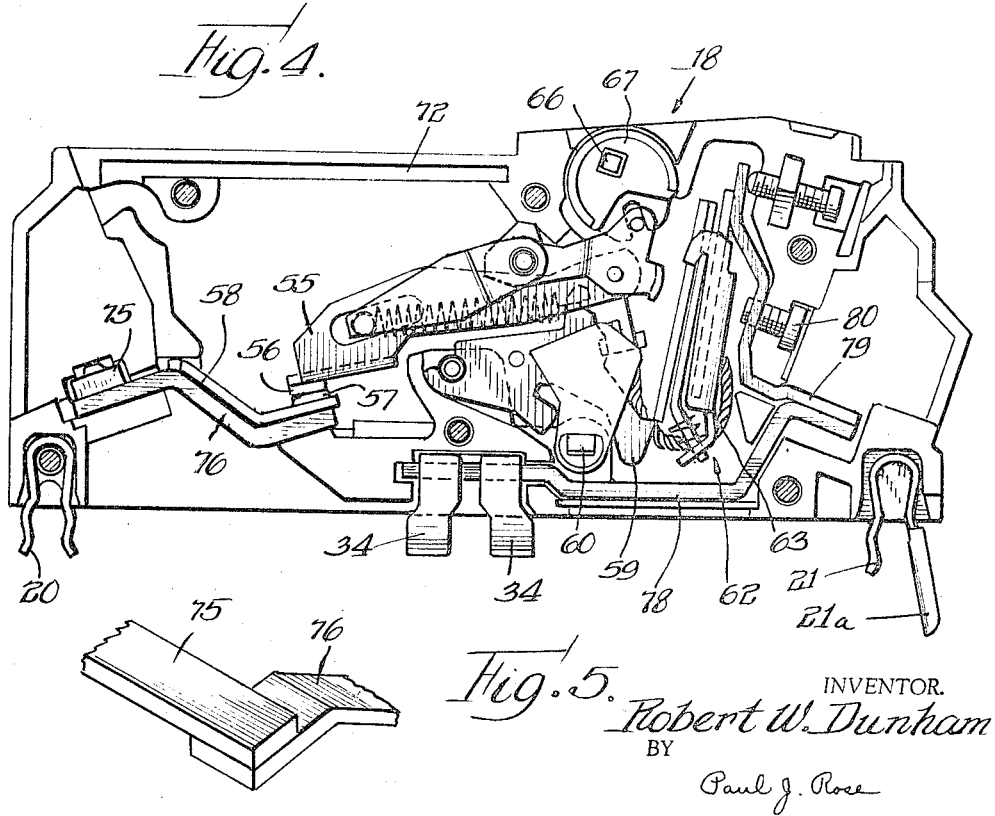

Nov. 1, 1966  R. W. DUNHAM  3,283,216
ELECTRICAL CIRCUIT BREAKER AND PANELBOARD WIRING ARRANGEMENT
Filed March 8, 1963  3 Sheets-Sheet 3
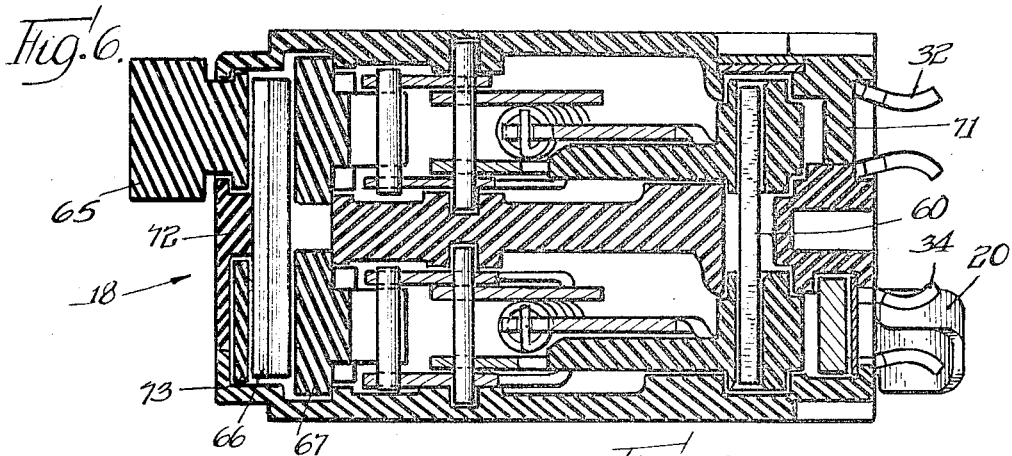
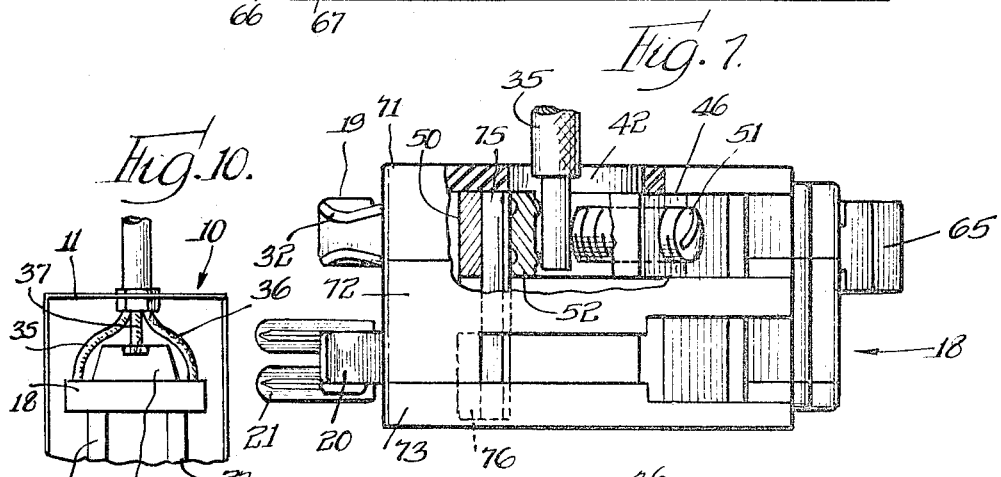
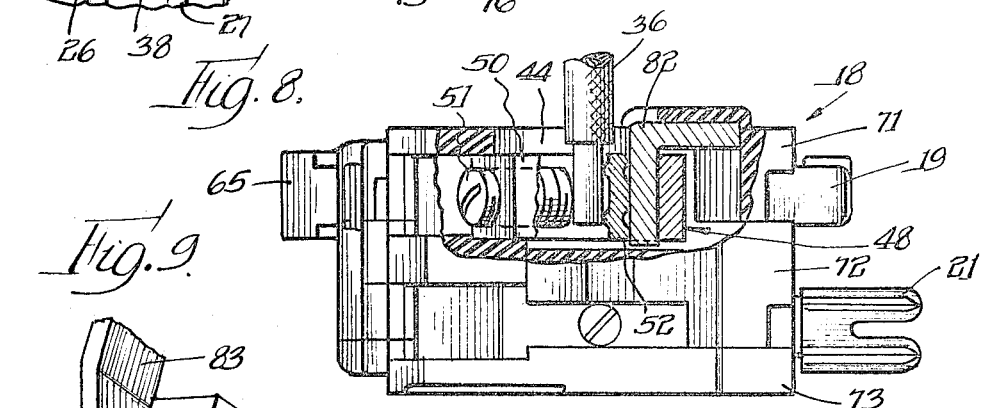
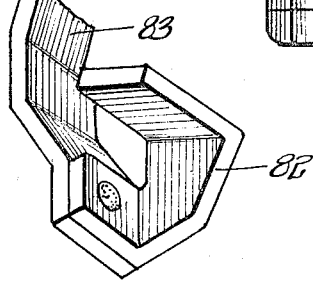
INVENTOR.
Robert W. Dunham
By: Paul J. Rose
Atty.

3,283,216
ELECTRICAL CIRCUIT BREAKER AND PANEL-
BOARD WIRING ARRANGEMENT
Robert W. Dunham, Cedar Rapids, Iowa, assignor to Square D Company, Park Ridge, Ill., a corporation of Michigan
Filed Mar. 8, 1963, Ser. No. 263,795
12 Claims. (Cl. 317—119)

This invention relates generally to electrical circuit breakers, and more particularly to a two-pole circuit breaker adapted to be used on an electrical panelboard as a main circuit breaker through which electrical power is fed to the remainder of the panelboard.

Electrical panelboards of the type with which the present invention is concerned generally include an insulating base which supports a neutral bar assembly and a bus bar system to which the main circuit breaker and a plurality of branch circuit breakers are electrically connected. These components are housed in a steel box which is apertured centrally of the top or bottom to receive the wires which supply the electrical power to the panelboard and which are electrically connected to the main circuit breaker adjacent opposite ends. Prior to this invention, the electrical power supply wires, which may be relatively large and stiff, required a considerable amount of space widthwise of the box in order to make the turn required to connect to the main circuit breaker endwise thereof. In accordance with this invention, two electrical power supply wires may be electrically connected respectively to two poles of a main circuit breaker sidewise and from the same side thereof, whereby less space is required between the main circuit breaker and the sides of the box and the box may be made smaller. Considerable amounts of time and effort are also saved by the more convenient wiring method.

An object of the invention is to provide an improved panelboard wiring arrangement.

Another object of the invention is to provide an improved circuit breaker construction facilitating the connection of a pair of electrical power supply wires respectively to two poles of a main circuit breaker supplying electrical power to the remainder of an electrical panelboard.

A further object is to provide a panelboard wiring arrangement permitting reduction of the required width of an enclosure of an electrical panelboard.

Another object of the invention is to provide an improved two-pole circuit breaker particularly adapted for use as a main circuit breaker in a panelboard through which the remainder of the panelboard is electrically energized and which serves as a back-up circuit breaker for other protective devices in the panelboard.

Other objects and advantages will appear when the following specification is considered along with the accompanying drawings in which:

FIGURE 1 is a fragmentary front elevational view of an electrical panelboard having a two-pole main circuit breaker mounted thereon, the construction of the circuit breaker and the arrangement of the electrical power supply connections thereto being in accordance with the invention;

FIGURE 2 is a sectional view of the panelboard taken substantially along line 2—2 of FIGURE 1 and showing the mounting means for the main circuit breaker;

FIGURE 3 is a sectional view of the main circuit breaker taken substantially along line 3—3 of FIGURE 1 and showing the mechanism of one pole thereof;

FIGURE 4 is a sectional view of the main circuit breaker taken substantially along line 4—4 of FIGURE 1 and showing the mechanism of the other pole thereof;

FIGURE 5 is a perspective view of certain electrical conductors forming a part of the main circuit breaker of FIGURE 1;

FIGURE 6 is a sectional view through the main circuit breaker of FIGURE 1 taken substantially along line 6—6 of FIGURE 3;

FIGURE 7 is a view of the main circuit breaker, partly in section, taken in the direction of arrows 7—7 of FIGURE 1;

FIGURE 8 is a view of the main circuit breaker, partly in section, taken in the direction of arrows 8—8 of FIGURE 1;

FIGURE 9 is a perspective view of certain other electrical conductors forming a part of the main circuit breaker of FIGURE 1; and FIGURE 10 is a schematic view of the panelboard of FIGURE 1 and shows a greater portion of the steel box forming the enclosure of the panelboard.

FIGURE 1 fragmentarily shows a rear wall portion of a steel box 10 forming an enclosure for a panelboard. Secured to the rear wall portion of the box 10 in any suitable manner is a mounting pan 12 having an opposing pair of beaded side edges 14 and 16 which serve as mounting rails for mechanically supporting circuit breakers. A two-pole circuit breaker 18 constructed in accordance with the invention is clipped on the mounting rails 14 and 16 as best shown in FIGURE 2, suitable mounting clips 19, 20, and 21 being provided on the circuit breaker for this purpose. The clip 21 has an extension 21a (FIGURE 4) for noninterchangeability purposes, as well understood by those skilled in the art.

An insulating base 24 secured to the mounting pan 12 in any suitable manner is provided for the mounting of a pair of bus bars or bus conductors 26 and 27 which have a plurality of connector straps 30 secured transversely thereto in alternating fashion so that when the circuit breaker 18 is placed in position on the mounting rails 14 and 16, a first pole of the circuit breaker, uppermost in FIGURE 1, will be electrically connected to the bus bar 26 and a second pole will be electrically connected to the bus bar 27 for supplying electrical power respectively thereto. For this purpose, the first pole is provided centrally of the rear thereof with a double pair of plug-in terminal jaws 32 for cooperation with one of the connector straps 30 extending to the bus bar 26, and the second pole is similarly provided with a double pair of plug-in terminal jaws 34 (FIGURE 4) for cooperation with the adjacent one of the connector straps 30 extending to the bus bar 27. Smaller single-pole load protecting circuit breakers (not shown) may be mounted on the remaining connector straps 30 in a conventional manner. The base 24 is provided with a plurality of integral barriers 25 extending between the connector straps 30.

In accordance with the invention, the electrical power supply lines for both poles of the circuit breaker 18 are connected respectively thereto from the same side of the circuit breaker adjacent opposite ends thereof, rather than directly from the opposite end faces as formerly. Thus, in FIGURE 1, a pair of electrical power supply conductors 35 and 36 are shown leading into the same side of the case of the circuit breaker 18, the conductor 35 being electrically connected to the second pole and the conductor 36 being electrically connected to the first pole as explained hereinafter. A third conductor 37, which is the neutral wire of the electrical power supply, is secured to a neutral bar assembly 38 mounted on an insulating block 40 secured to the pan 12. If desired, the block 40 may be integral with the base 24. As shown in FIGURE 2, the conductors 35 and 36 respectively enter a pair of apertures 42 and 44 in a side of the circuit breaker 18 for clamping respectively in a pair of identical electrical connectors 46 and 48 which are preferably constructed in accordance with the teachings of copending application, Serial No. 188,614, filed on April 13, 1962, now Patent No. 3,187,299, issued June 1, 1965, and assigned to the assignee of the present invention, the said copending application being a continuation of application, Serial No. 821,307, filed on June 18, 1959, and now abandoned. As shown in FIGURES 3, 7, and 8, both connectors 46 and 48 are located in a compartment of the case which houses the first pole of the two-pole circuit breaker 18, and each includes an apertured aluminum body portion 50, a clamping screw 51, and an aluminum clamping shoe 52.

The operating mechanism for each pole of the circuit breaker 18 is identical to that described in United States Patent No. 3,061,697 and is not a novel part of the present invention and therefore need not be described in detail herein. The operating mechanism for the first pole is shown in FIGURE 3, and that for the second pole is shown in FIGURE 4. The operating mechanism of each pole includes a pivotally mounted contact arm 55 having a movable contact 56 secured thereto for engagement with and disengagement from a stationary contact 57 provided with an arc runner 58. For automatic disengagement of the contacts 56 and 57 upon flow of overload current through the circuit breakers, each pole is provided with a releasably latched trip lever 59 operatively connected to its respective contact arm 55 and also operatively connected to the trip lever 59 of the other pole by means which includes a common trip bar 60 shown in FIGURES 3, 4, and 6. Each trip lever 59 is releasably latched by a thermally and magnetically responsive automatic tripping mechanism 62 which is electrically connected to its respective contact arm 55 by a braided copper wire 63. For manual operation, the first pole is provided with a pivotally mounted handle 65 operatively connected to the respective contact arm 55 and also operatively connected to the contact arm 55 of the second pole by means which includes a crossbar 66 shown in FIGURES 3, 4, and 6 and a pivotally mounted operating member 67 identical to the inner portion of the handle 65 but having no portion projecting exteriorly of the case of the circuit breaker 18. For a more complete description of the operating mechanism, reference may be had to the above-mentioned patent.

The case of the circuit breaker 18 is preferably molded of insulating material and formed of three separate portions 71, 72, and 73 secured together by suitable means such as rivets. The outer portion 71 may be considered a base for the first pole, the intermediate portion 72 may be considered a combination cover for the first pole and base for the second pole, and the outer portion 73 may be considered a cover for the second pole. The portions 71 and 72 thus form a first compartment for the first pole and the portions 72 and 73 thus form a second compartment for the second pole of the two-pole circuit breaker 18, the two compartments being longitudinally side-by-side. The apertures 42 and 44 for respectively receiving the conductors 35 and 36 are in the portion 71. Preferably, but not necessarily, the connector 46 for the second pole is in the first compartment formed by the case portions 71 and 72. The internal connections between the plug-in terminal jaws 32 and the electrical connector 48, and between the plug-in terminal jaws 34 and the electrical connector 46, will now be described.

A straight copper terminal strap 75, best shown in FIGURE 5, is received in the connector 46 between the body portion 50 and the clamping shoe 52 thereof (FIGURES 3 and 7) and extends from the connector 46 in the first compartment through the case portion 72 and into the second compartment where it is joined to one end portion of a reversely bent conductor 76 (FIGURES 4 and 5) having the stationary contact 57 for the second pole mounted on the other end portion thereof. The plug-in terminal jaws 34 are mounted on one end portion of a formed copper terminal strap 78 (FIGURE 4) and the automatic tripping mechanism 62 for the second pole is mounted on one end portion of a formed conductor 79 secured to the case portion 72 by a mounting screw 80. The other end portions of the terminal strap 78 and conductor 79 are mechanically and electrically joined to each other as by brazing. If desired, the terminal strap 75 and conductor 76 may be formed as one piece, and the terminal strap 78 and conductor 79 may be formed as one piece. When current flows through the second pole, an electrical circuit may be traced from the conductor 35 through the clamping shoe 52 of the connector 46, terminal strap 75, conductor 76, through the stationary contact 57, movable contact 56, contact arm 55, braided wire 63, and tripping mechanism 62 of the second pole, through the conductor 79, terminal strap 78, and the jaws 34 to the respective connector strap 30 and the bus bar 27.

One end portion of a formed copper terminal strap 82, best shown in FIGURE 9, is received in the connector 48 between the body portion 50 and the clamping shoe 52 thereof (FIGURES 3 and 8), the other end portion of the terminal strap 82 being joined to one end portion of a formed conductor 83 (FIGURES 3 and 9) secured to the case portion 71 by a mounting screw 84 and having the automatic tripping mechanism 62 for the first pole mounted on the other end portion thereof. The plug-in terminal jaws 32 are mounted on an end portion of a formed copper terminal strap 86 (FIGURE 3) having the stationary contact 57 for the first pole mounted thereon in spaced relationship to the jaws 32. If desired, the terminal strap 82 and the conductor 83 may be formed as one piece. When current flows through the first pole, an electrical circuit may be traced from the conductor 36 through the clamping shoe 52 of the connector 48, terminal strap 82, conductor 83, through the tripping mechanism 62, braided wire 63, contact arm 55, movable contact 56, and stationary contact 57 of the first pole, through the terminal strap 86 and the jaws 32 to the respective connector strap 30 and bus bar 26.

It will be noted that for the first pole, the connector 48 is on the movable contact side of the electrical circuit and the plug-in terminal jaws 32 are on the stationary contact side of the electrical circuit, while for the second pole, the connector 46 is on the stationary contact side of the electrical circuit and the plug-in terminal jaws 34 are on the movable contact side of the electrical circuit.

FIGURE 10 schematically shows the conductors 35, 36, and 37 entering the box 10 centrally of a top wall portion 11 thereof. It will be noted that the end portions of the conductors 35 and 36 enter the circuit breaker 18 in a direction generally parallel to the bus bars 26 and 27.

It will be seen that a method of reducing the required width of an enclosure of an electrical panelboard has been provided by providing an improved panelboard wiring arrangement and an improved two-pole circuit breaker particularly adapted for use as a main circuit breaker of an electrical panelboard through which the remainder of the electrical panelboard is electrically energized.

Various modifications may be made in the structure disclosed without departing from the spirit and scope of the invention.

I claim:
1. A multipole molded-case circuit breaker comprising
   (a) an elongated case having a pair of generally parallel outer side wall portions and an inner intermediate wall portion generally parallel to said outer side wall portions, said wall portions collectively defining a pair of longitudinally side-by-side compartments in said case
   (b) a pair of circuit breaker mechanisms disposed respectively in said compartments, and
   (c) a pair of openings in said case in one of said outer side wall portions defining one of said compartments for respectively receiving a pair of electrical power supply conductors adapted to be connected respectively to said circuit breaker mechanisms.

2. A two-pole molded-case circuit breaker comprising
(a) an elongated case having a pair of generally parallel outer side wall portions and an inner intermediate wall portion generally parallel to said outer side wall portions, said wall portions collectively defining a pair of longitudinally side-by-side compartments in said case,
(b) a pair of circuit breaker mechanisms disposed respectively in said compartments,
(c) a pair of openings in said case in one of said outer side wall portions thereof defining one of said compartments, and
(d) a pair of electrical connectors in said case respectively associated with said openings and electrically connected to said circuit breaker mechanisms, each of said connectors having a body portion having an aperture therein generally aligned with the respective opening in said case and adapted to receive an electrical power supply conductor.

3. A two-pole molded-case circuit breaker comprising
(a) an elongated case having a pair of generally parallel outer side wall portions and an inner intermediate wall portion generally parallel to said outer side wall portions, said wall portions collectively defining a pair of longitudinally side-by-side compartments in said case,
(b) a pair of circuit breaker mechanisms disposed respectively in said compartments,
(c) a pair of openings in said case adjacent opposite end portions of one of said outer side wall portions of said case defining one of said compartments, and
(d) a pair of electrical connectors in said case respectively associated with said openings and electrically connected to said circuit breaker mechanisms, each of said connectors having a body portion having an aperture therein generally aligned with the respective opening in said case and adapted to receive an electrical power supply conductor.

4. A two-pole molded-case circuit breaker comprising
(a) an elongated case having a pair of generally parallel outer side wall portions and an inner intermediate wall portion generally parallel to said outer side wall portions, said wall portions collectively defining a pair of longitudinally side-by-side compartments in said case,
(b) a pair of circuit breaker mechanisms disposed respectively in said compartments,
(c) a pair of openings in said case in one of said outer side wall portions thereof defining one of said compartments, and
(d) a pair of electrical connectors in said one of said compartments respectively associated with said openings and electrically connected to said circuit breaker mechanisms, each of said connectors having a body portion having an aperture therein generally aligned with the respective opening in said case and adapted to receive an electrical power supply conductor.

5. A two-pole molded-case circuit breaker comprising
(a) an elongated case having a pair of generally parallel outer side wall portions and an inner intermediate wall portion generally parallel to said outer side wall portions, said wall portions collectively defining a pair of longitudinally side-by-side compartments in said case,
(b) a pair of circuit breaker mechanisms disposed respectively in said compartments, each of said circuit breaker mechanisms including a stationary contact and a movable contact engageable therewith,
(c) a pair of openings in said case in one of said outer side wall portions thereof defining one of said compartments, and
(d) a pair of electrical connectors in said case respectively associated with said openings, each of said connectors having a body portion having an aperture therein generally aligned with the respective opening in said case and adapted to receive an electrical power supply conductor, one of said connectors being electrically connected to one of said circuit breaker mechanisms on the stationary contact side of an electrical circuit therethrough, and the other of said connectors being electrically connected to the other of said circuit breaker mechanisms on the movable contact side of an electrical circuit therethrough.

6. An electrical panelboard and main circuit breaker combination comprising
(a) a steel box having a rear wall portion, a top wall portion, and a pair of opposed side wall portions,
(b) a pair of elongated spaced bus conductors mounted in said box on said rear wall portion and extending generally parallel to said opposed side wall portions,
(c) a two-pole molded-case main circuit breaker having a pair of elongated longitudinally side-by-side compartments therein extending transversely of said bus conductors,
(d) a pair of circuit breakers mechanisms disposed respectively in said compartments and electrically connected respectively to said bus conductors, and
(e) a pair of electrical power supply conductors extending through said top wall portion of said box and electrically connected respectively to said circuit breaker mechanisms, said power supply conductors extending through a common outer side wall portion of said case defining one of said compartments and the end portions of said power supply conductors entering said case being generally parallel to said bus conductors.

7. An electrical panelboard and main circuit breaker combination as claimed in claim 6, including a neutral bar assembly disposed between said main circuit breaker and said top wall portion of said box, and a third electrical conductor extending through said top wall portion of said box and electrically connected to said neutral bar assembly.

8. An electrical panelboard and main circuit breaker combination comprising
(a) a pair of parallel spaced elongated bus conductors,
(b) a two-pole molded-case main circuit breaker including an elongated case having a pair of generally parallel outer side wall portions and an inner intermedate wall portion generally parallel to said outer side wall portions, said wall portions collectively defining a pair of elongated longitudinally side-by-side compartments extending transversely of said bus conductors,
(c) a pair of circuit breakers mechanisms disposed respectively in said compartments and electrically connected respectively to said bus conductors, and
(d) a pair of electrical power supply conductors electrically connected respectively to said circuit breaker mechanisms, both of said power supply conductors extending through a single one of said outer side wall portions of said case defining one of said compartments and the end portions of said power supply conductors entering said case being generally parallel to said bus conductors.

9. A two-pole molded-case circuit breaker as claimed in claim 4, wherein both of said electrical connectors are in one of said compartments.

10. A two-pole molded-case circuit breaker as claimed in claim 3, wherein one of said electrical connectors is electrically connected to one of said circuit breaker mechanisms on the stationary contact side of an electrical circuit therethrough and the other of said electrical connectors is electrically connected to the other of said circuit breaker mechanisms on the movable contact side of an electrical circuit therethrough.

11. A two-pole moleded-case circuit breaker as claimed in claim 5, wherein both of said electrical connectors are in one of said compartments.

12. A two-pole molded-case circuit breaker as claimed in claim 10, wherein both of said electrical connectors are in one of said compartments.

References Cited by the Examiner

UNITED STATES PATENTS

| | | | |
|---|---|---|---|
| 2,103,072 | 12/1937 | Frank | 317—119 |
| 2,440,824 | 5/1948 | Jackson | 317—119 |
| 3,076,952 | 2/1963 | Powell | 339—150 |
| 3,082,309 | 3/1963 | Carissimi | 200—153 |
| 3,143,627 | 8/1964 | Kiesel | 200—158 |
| 3,213,327 | 10/1965 | Norden | 317—119 |

ROBERT K. SCHAEFER, *Primary Examiner.*

JOHN F. BURNS, KATHLEEN H. CLAFFY,
*Examiners.*

J. G. COBB, H. J. RICHMAN, W. C. GARVERT,
*Assistant Examiners.*

UNITED STATES PATENT OFFICE
CERTIFICATE OF CORRECTION

Patent No. 3,283,216 November 1, 1966

Robert W. Dunham

It is hereby certified that error appears in the above numbered patent requiring correction and that the said Letters Patent should read as corrected below.

Column 4, line 70, after "case" insert a comma; column 6, line 26, for "breakers" read -- breaker --; lines 51 and 52, for "intermedate" read -- intermediate --; line 57, for "breakers" read -- breaker --; same column 6, line 69, for "4" read -- 3 --; column 7, line 4, for "moleded-case" read -- molded-case --.

Signed and sealed this 5th day of September 1967.

(SEAL)
Attest:

ERNEST W. SWIDER
Attesting Officer

EDWARD J. BRENNER
Commissioner of Patents